United States Patent [19]
Powlousky

[11] Patent Number: 6,088,580
[45] Date of Patent: Jul. 11, 2000

[54] BATTERY OPERATED, PORTABLE TRANSMITTER HAVING COIL SURROUNDING TUBULAR, FERROMAGNETIC HOUSING

[75] Inventor: Peter Powlousky, 11355 - 111 Avenue, Edmonton, Alberta, Canada, T5G 0C8

[73] Assignee: Peter Powlousky, Edmonton, Canada

[21] Appl. No.: 09/123,944

[22] Filed: Jul. 28, 1998

[51] Int. Cl.[7] .............. H04B 1/034; H04B 5/00; H01Q 1/12; G01V 3/00

[52] U.S. Cl. .............. 455/95; 324/228; 324/326; 455/128

[58] Field of Search .............. 324/67, 228, 326, 324/327, 207.17; 455/90, 95, 128; 343/718–720; 340/572.6, 572.8; 600/424; 175/45

[56] References Cited

U.S. PATENT DOCUMENTS

| | | | |
|---|---|---|---|
| 2,820,959 | 1/1958 | Bell | 324/67 X |
| 3,597,680 | 8/1971 | Haddon | 324/67 X |
| 4,998,058 | 3/1991 | Tofte et al. | 324/67 |
| 5,337,002 | 8/1994 | Mercer | 324/326 |
| 5,400,008 | 3/1995 | Toohey | 340/321 |
| 5,530,357 | 6/1996 | Cosman et al. | 324/326 |

OTHER PUBLICATIONS

U.S. application No. 4,101,894, Warner et al., issued Jul. 18, 1978, 2 pages.
U.S. application No. 4,759,051, Han, issued Jul. 19, 1988, 2 pages.
U.S. application No. 5,001,772, Holcomb et al., issued Mar. 19, 1991, 1 page.
U.S. application No. 5,226,061, Van der Veen, issued Jul. 6, 1993, 2 pages.
U.S. application No. 5,631,503, Cioffi, issued May 20, 1997, 1 page.
U.S. application No. 5,703,464, Karunasiri et al., issued Dec. 30, 1997, 3 pages.

*Primary Examiner*—Gerard Strecker
*Attorney, Agent, or Firm*—Christensen O'Connor Johnson & Kindness PLLC

[57] ABSTRACT

A compact portable transmitter includes a ferromagnetic tubular housing. A electro-magnetic coil is wrapped around an exterior surface of the housing, such that the housing serves as a transmitter core. A protective covering is positioned over the electro-magnetic coil. Batteries are positioned within the housing to supply power to the electro-magnetic coil and associated transmitting electronics.

3 Claims, 1 Drawing Sheet

BATTERY OPERATED, PORTABLE TRANSMITTER HAVING COIL SURROUNDING TUBULAR, FERROMAGNETIC HOUSING

FIELD OF THE INVENTION

The present invention relates to a transmitter.

BACKGROUND OF THE INVENTION

There are various applications in which portable transmitters are required. For example, transmitters are placed inside pipeline pigs used in fluid transmission pipelines to determine the position of the pigs as they travel along the pipeline. For example, transmitters are carried in some aircraft and vessels to aid in search and rescue, should the aircraft or vessel encounter problems. It is desirable that the transmitters be as compact as possible.

SUMMARY OF THE INVENTION

What is required is a more compact form of transmitter.

According to the present invention there is provided a transmitter which includes a ferromagnetic tubular housing having an exterior surface. An interior surface and closed end of the housing define an interior cavity. One end of the housing is an open end which has an access opening. A closure is detachably secured to the open end of the housing to close the access opening. Transmitting electronics are provided. An electro-magnetic coil is wrapped around the exterior surface of the housing, such that the housing serves as a transmitter core. A protective covering is positioned over the electro-magnetic coil. A first battery connection is positioned at the closed end of the housing. A second battery connection is positioned in the closure. A conductive circuit passes through the first battery connection, the electro-magnetic coil, and the transmitting electronics to the second battery connection. When batteries are positioned within the housing, the batteries supply power to the electro-magnetic coil and the transmitting electronics.

With the transmitter, as described above, the housing in which the batteries are housed serves as the core of the transmitter. This allows the transmitter to be a smaller, sealed, self-contained unit.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
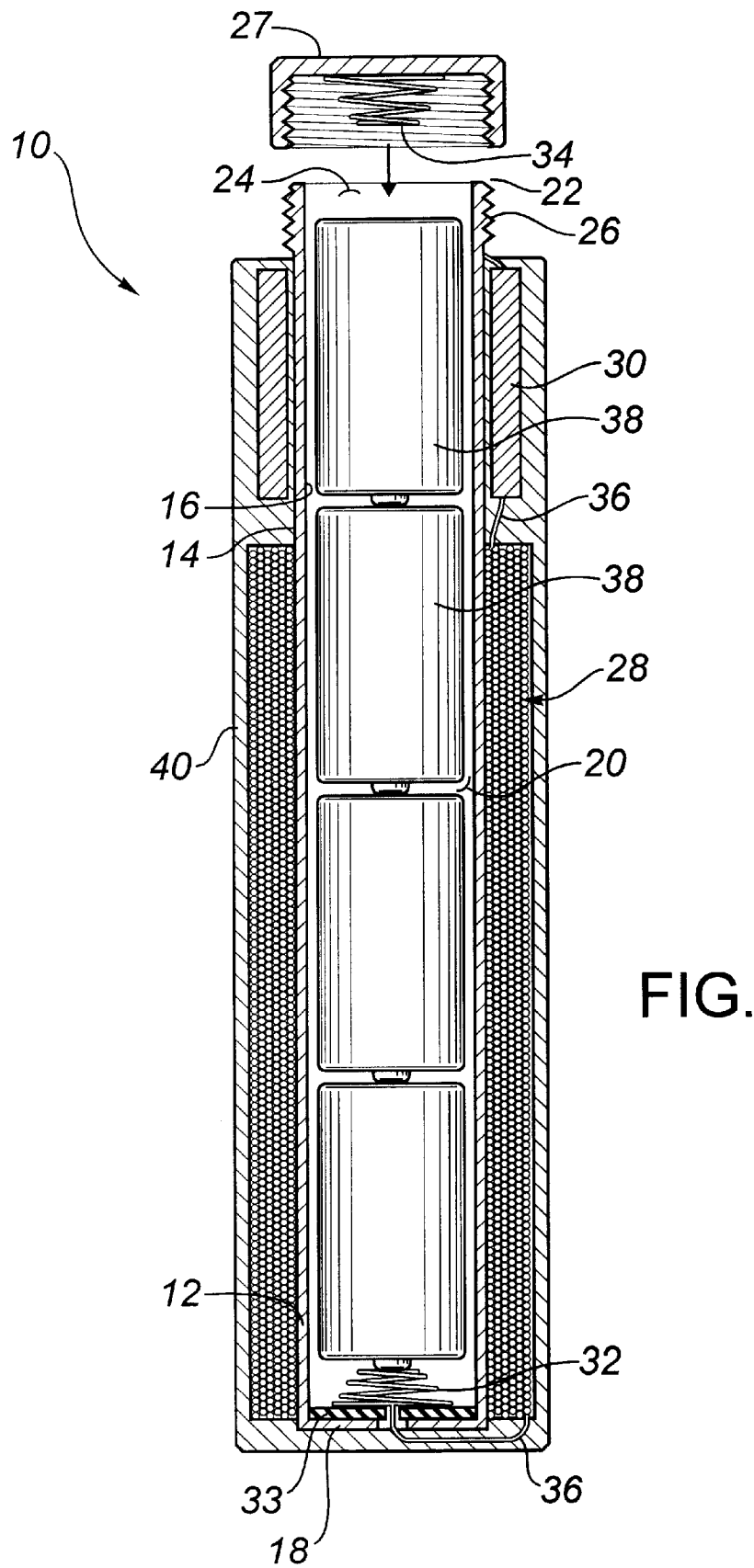
FIG. 1 is side elevation view of a transmitter constructed in accordance with the teachings of the present invention.

The preferred embodiment, a transmitter generally identified by reference numeral 10, will now be described with reference to FIG. 1.

With reference to FIG. 1, the body of transmitter 10 includes a tubular housing 12 having an exterior surface 14. An interior surface 16 and closed end 18 define an interior cavity 20. An open end 22 provides an access opening 24. The housing 12 is constructed from a ferromagnetic material such as a low carbon steel. The exterior surface 14 of housing 12 at open end 22 is threaded 26. A detachable closure cap 27 threadedly engages threads 26 at open end 22 to close the access opening 24. A electro-magnetic coil 28 is wrapped around the exterior surface 14 of the housing 12. The housing 12 has transmitting electronics 30 which is also positioned around the exterior surface 14 of the housing 12 adjacent to electro-magnetic coil 28. The ferromagnetic housing 12 thereby serves as a transmitter core for transmitter 10.

A first battery connection 32 is positioned at the closed end 18 of the housing 12 and is insulated from the conducting material of the housing 12 by means of an insulator disk 33. A second battery connection 34 is positioned in the detachable closure cap 27. A conductive circuit is completed by means of the conductive housing 12 and wiring 36 connecting the first battery connection 32, the electro-magnetic coil 28, and the transmitting electronics 30 to the second battery connection 34. Batteries 38 positioned within interior cavity 20 of the housing 12 supply power to the electro-magnetic coil 28 and transmitting electronics 30.

A protective covering 40 composed of non-conducting material such as a hard epoxy resin covers the magnetic coil 28, the transmitting electronics 30, and the exterior surface 14 of housing 12 except for the threaded area 26 of open end 22.

It will be apparent to one skilled in the art that modifications may be made to the illustrated embodiment without departing from the spirit and scope of the invention as hereinafter defined in the Claims.

The embodiments of the invention in which an exclusive property or privilege is claimed are defined as follows:

1. A transmitter, comprising:
    a ferromagnetic tubular housing having an exterior surface, an interior surface and closed end defining an interior cavity, and an open end having an access opening;
    a closure detachably secured to the open end of the housing to close the access opening;
    transmitting electronics positioned in one of the interior cavity and around the exterior surface of the housing;
    an electro-magnetic coil wrapped around the exterior surface of the housing, such that the housing serves as a transmitter core;
    a protective covering over the electro-magnetic coil; and
    a first battery connection positioned at the closed end of the housing;
    a second battery connection positioned in the closure;
    a conductive circuit through the first battery connection, the electro-magnetic coil, and the transmitting electronics to the second battery connection, such that batteries positioned within the housing supply power to the electro-magnetic coil and transmitting electronics.

2. The transmitter as defined in claim 1, wherein the protective covering is a hard epoxy resin.

3. A transmitter, comprising:
    a ferromagnetic tubular housing having an exterior surface, an interior surface and closed end defining an interior cavity, and an open end having an access opening;
    a closure cap threaded onto the open end of the housing to close the access opening;
    transmitting electronics positioned around the exterior surface of the housing;
    an electro-magnetic coil wrapped around the exterior surface of the housing, such that the housing serves as a transmitter core for the transmitting electronics;
    a protective covering of hardened epoxy resin over the transmitting electronics and the electro-magnetic coil; and a first battery connection positioned at the closed end of the housing;

a second battery connection positioned in the closure cap;

a conductive circuit through the first battery connection, the electro-magnetic coil, and the transmitting electronics to the second battery connection, such that batteries positioned within the housing supply power to the electro-magnetic coil and transmitting electronics.

\* \* \* \* \*